United States Patent [19]
Hase et al.

[11] 4,100,454
[45] Jul. 11, 1978

[54] LOW-VELOCITY ELECTRON EXCITED FLUORESCENT DISPLAY DEVICE

[75] Inventors: Takashi Hase, Fujisawa; Akiyasu Kagami, Ninomiyamachi Kawawa; Yoshiyuki Mimura, Kamakura; Kinichiro Narita; Minoru Hiraki, both of Chigasaki, all of Japan

[73] Assignee: Dai Nippon Toryo Co., Ltd., Osaka, Japan

[21] Appl. No.: 650,613

[22] Filed: Jan. 20, 1976

[30] Foreign Application Priority Data

Jun. 7, 1975 [JP] Japan .................................. 50-68685

[51] Int. Cl.$^2$ ........................ C09K 11/08; H01J 63/04
[52] U.S. Cl. .............................. 313/495; 252/301.4 R
[58] Field of Search ............... 313/467, 495, 496, 497; 252/301.4 R

[56] References Cited

U.S. PATENT DOCUMENTS

| 2,143,527 | 1/1939 | Schmidling | 313/495 |
| 2,876,374 | 3/1959 | Riggen | 313/495 |
| 3,407,325 | 10/1968 | Brown, Jr. | 252/301.4 R |
| 3,499,843 | 3/1970 | Brown, Jr. et al. | 252/301.4 R |
| 3,576,757 | 4/1971 | Brown, Jr. | 252/301.4 R |
| 3,737,705 | 6/1973 | Takeda et al. | 313/496 |
| 3,846,662 | 11/1974 | Hooker | 313/496 |
| 3,880,770 | 4/1975 | Chenot | 252/301.4 R |

Primary Examiner—Palmer C. Demeo

[57] ABSTRACT

A fluorescent display device capable of emitting blue to green light of high luminance and purity is composed of a vacuum tube having an anodic plate bearing thereon a fluorescent screen and a cathode facing the fluorescent screen. The fluorescent screen comprises a gallate-based phosphor represented by the formula $$A(Zn_{1-x}Mg_x)O \cdot Ga_2O_3 : BMn$$

wherein $0.6 \leq A \leq 1.2$, $0 \leq B \leq 5 \times 10^{-2}$, and $0 \leq x \leq 1.0$. The vacuum tube may further contain a control grid between the anodic plate and the cathode.

4 Claims, 5 Drawing Figures

LOW-VELOCITY ELECTRON EXCITED FLUORESCENT DISPLAY DEVICE

BACKGROUND OF THE INVENTION

1. Field of the Invention

The present invention relates to a fluorescent display device which emits blue or green light under low-velocity electron excitation, and more particularly to a fluorescent display device comprising a vacuum tube including therein an anodic plate bearing a fluorescent screen made of a novel fluorescent material and a cathode to emit low-velocity electrons.

2. Description of the Prior Art

There is well known a low-velocity electron excited fluorescent display device (hereinafter referred to simply as "display device" or "fluorescent display device") essentially comprising a vacuum tube having disposed therein an anodic plate having on one surface thereof a fluorescent screen and a cathode as an electron source facing said fluorescent screen which screen is caused to emit luminescence when low-velocity electrons emitted from the cathode impinge thereon.

As a phosphor capable of providing high luminescence upon excitation by low-velocity electrons, zinc-activated zinc oxide phosphor (ZnO:Zn) has hitherto been known. The phosphor may be prepared by firing zinc oxide in a reducing atmosphere or by firing in air zinc oxide added with a small amount of a zinc compound such as zinc sulfide. This phosphor emits green-white light of high luminance when excited by low-velocity electrons.

The display tubes having a fluorescent screen of ZnO:Zn are now been widely used as display devices for desk or pocket electronic calculators, various measuring instruments and so forth. However, the color of the light emitted from ZnO:Zn under the low-velocity electron excitation is greenish white and hence the aforesaid conventional display devices using ZnO:Zn as the fluorescent screen show insufficient color purity. Therefore, a fluorescent display device capable of emitting green light of excellent color purity is desired.

SUMMARY OF THE INVENTION

The primary object of this invention is, therefore, to provide a fluorescent display device capable of emitting light of high luminance and high color purity.

A specific object of this invention is to provide a fluorescent display device which emits blue or green light of high luminance and purity when excited by low-velocity electrons.

As the result of various studies directed to discovering phosphors capable of emitting light of high luminance and purity under the low-velocity electron excitation and to developing display devices using such a phosphor as the fluorescent screen, the inventors have discovered that a gallate-based phosphor represented by the formula $$A(Zn_{1-x}Mg_x)O \cdot Ga_2O_3:BMn$$

wherein $0.6 \leq A \leq 1.2$, $0 \leq B \leq 5 \times 10^{-2}$, and $0 \leq x \leq 1.0$ emits blue light of high luminance under the low-velocity electron excitation when not activated, i.e., $B = 0$, and emits green-blue to green light when activated, i.e., $0 < B \leq 5 \times 10^{-2}$ in the above formula. That is, according to the present invention, there is provided a fluorescent display device composed of a vacuum tube containing therein an anodic plate having formed on one surface thereof a fluorescent screen and a cathode facing the fluorescent screen wherein said fluorescent screen comprises a gallate-based phosphor represented by the formula $$A(Zn_{1-x}Mg_x)O \cdot Ga_2O_3:BM_n$$

where A, B and x have the same significance as defined above.

DESCRIPTION OF THE PREFERRED EMBODIMENTS

Figure 1:
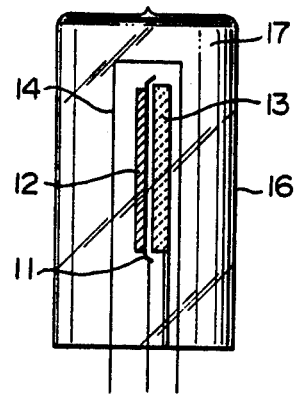
FIG. 1 is a schematic view showing an embodiment of a display device in accordance with this invention.
Figure 2:
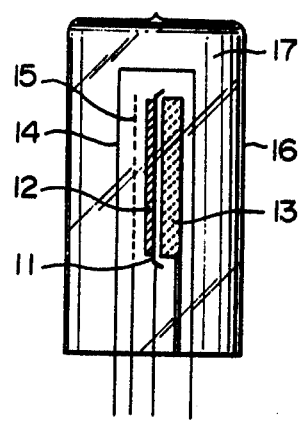
FIG. 2 is a schematic view showing an embodiment of a triode type display device in accordance with this invention.

Two examples of the structure of the fluorescent display device in accordance with this invention are schematically illustrated in FIG. 1 and FIG. 2. FIG. 1 shows a diode type display tube and FIG. 2 shows a triode type display tube. As shown in these figures, a fluorescent screen 12 is formed on one surface of an anodic plate 11 supported by a ceramic base plate 13. A cathode 14 is disposed facing the fluorescent screen 12 formed on the surface of the anodic plate 11 and the fluorescent screen 12 is excited by low-velocity electrons emitted from the cathode 14 to cause luminescence. In the triode type display tube illustrated in FIG. 2, a control electrode or grid 15 is disposed between the fluorescent screen 12 and the cathode 14 for controlling or diverging the low-velocity electrons. In the display tubes illustrated in FIGS. 1 and 2, only one cathode 14 is used. However, if the size of the fluorescent screen is large, two or more cathodes may be employed and thus there is no particular limitation on the number of cathodes. The anodic plate 11 having the fluorescent screen 12 on the surface thereof, the ceramic base plate 13, the cathode 14 and the control grid 15 (when provided) are kept in a sealed transparent tube 16 as of glass the inside of which is kept at a high vacuum of $10^{-5}$ to $10^{-9}$ Torr.

In the display device of this invention, a gallate-based phosphor represented by the formula $$A(Zn_{1-x}Mg_x)O \cdot Ga_2O_3:BM_n$$

wherein $0.6 \leq A \leq 1.2$, $0 \leq B \leq 5 \times 10^{-2}$, and $0 \leq x \leq 1.0$ is used as the material composing the fluorescent screen 12. The fluorescent screen 12 employed in the display tube of this invention shows blue or green light of high luminance and high color purity.

The gallate-based phosphors represented by the aforesaid composition formula used in this invention are prepared in the following manners.

Zinc oxide (ZnO) or zinc compound which can be easily converted into zinc oxide by firing at a high temperature, such as zinc carbonate, zinc sulfate, zinc nitrate, etc.; magnesium oxide (MgO) or magnesium compound which can be easily converted into magnesium oxide by firing at a high temperature, such as magnesium carbonate, magnesium sulfate, magnesium nitrate, etc.; gallium oxide ($Ga_2O_3$) or gallium compound which can be easily converted into gallium oxide by firing at a high temperature, such as gallium carbonate, gallium sulfate, gallium nitrate, etc.; and manganese oxide (MnO) or manganese compound which can be easily converted into manganese oxide by firing at a high temperature, such as manganese sulfate, manganese chloride, etc., are mixed together at such a compounding ratio that the composition formula of the mixture calculated as oxides becomes $$A(Zn_{1-x}Mg_x)O \cdot Ga_2O_3 \cdot BMnO$$

wherein $0.6 \leq A \leq 1.2$, $0 \leq B \leq 5 \times 10^{-2}$, and $0 \leq x \leq 1.0$. The aforesaid raw materials are mixed together sufficiently by means of a ball mill, mixer, etc., and the firing of the mixture is carried out once to several times for one hour at high temperature above 1000° C in air, a neutral atmosphere or weak-reducing atmosphere. When the activator is used, however, the mixture must be fired finally in a neutral or inert atmosphere such as nitrogen or argon or alternatively in a weak-reducing atmosphere such as, for example, a nitrogen-hydrogen gas with a hydrogen content of lower than 10% for preventing manganese from being oxidized into tri-valent or tetra-valent manganese. In a preferred embodiment, the firing is carried out for 2 to 4 hours at a temperature of 1200° to 1400° C in air, or for 2 to 4 hours at a temperature of 1000° to 1200° C in a neutral or weak-reducing atmosphere. Furthermore, when the mixture is fired twice or more, the reaction can be promoted by pulverizing the previously fired mixture.

It is known that the gallate-based phosphors having the composition formula $$A(Zn_{1-x}Mg_x)O \cdot Ga_2O_3 : BM_n$$

wherein $0.6 \leq A \leq 1.2$, $0 \leq B \leq 5 \times 10^{-2}$, and $0 \leq x \leq 1.0$, luminesce at high luminance when excited by ultraviolet rays or an electron beam accelerated at a high electric potential of a few kilovolts. However, it has never been known that said phosphors are caused to luminesce at a high luminance when excited by low-velocity electrons. This fact has been first discovered by the inventors and the present invention is based on the discovery of said properties of the phosphors.

The manner of making the display devices of this invention will now be described in detail. First, gallate-based phosphor is coated on an anodic plate 11, which is ordinarily supported on a ceramic base plate 13 by a sedimentation method to form thereon a fluorescent screen or layer. The anodic plate 11 is placed in an aqueous suspension of the phosphor powder, which by its own weight then deposits on the surface of the anodic plate 11 to form a layer of the phosphor 12. The water is removed when the deposition in completed and the layer of phosphor thus formed is dried. In this case, to increase the adhesion of the fluorescent screen 12 to the surface of the anodic plate 11, a small amount (e.g., 0.01-1%) of water glass may be incorporated in the suspension of the phosphor. The amount of phosphor coated on the anodic plate 11 should preferably be 5-30 mg/cm². Although said sedimentation coating method is most generally employed for making the fluorescent screen 12, the fluorescent screen 12 for the display device of this invention can be formed by other methods as well.

The anodic plate 11 having the fluorescent screen 12 formed thereon and a cathode 14 composed of a wire heater coated with an alkali earth oxide such as barium oxide, strontium oxide, calcium oxide, etc., are disposed at an interval of about 5mm so that the cathode 14 faces the fluorescent screen 12 on the anodic plate 11, and the pair of the electrodes 14 and 12 are fixed in a transparent container 16 such as a glass tube, which is then evacuated. When the inside pressure of the container 16 becomes lower than $10^{-4}$ Torr, the evacuation is stopped and the container 16 is sealed. After sealing the container 16, a getter is vaporised therein to further increase the degree of vacuum in the container. Thus, a fluorescent display device is obtained. In addition, since the fluorescent screen 12 formed on the anodic plate 11 is in a plate-like form and the cathode 14 is in a line form, it is desirable to provide a mesh control grid 15 between the cathode 14 and the fluorescent screen 12 as shown in FIG. 2 in order to diverge the low-velocity electrons emitted from the cathode 14. In this case, to obtain better results, the mesh of the grid 15 should be as fine as possible so as to reduce the loss of emission of light from the fluorescent screen 12 and sufficiently diverge the low-velocity electrons from the cathode 14. Practically, it is desirable that the diameter of the apertures of the mesh of the grid 15 be less than 500 microns and that the opening ratio, i.e., the ratio of the area of the apertures through which the low-velocity electrons pass to the total area of the control grid 15 be higher than 50%.

If the anodic plate 11 is partitioned into two or more parts having the form of characters or numerals and electric potential is selectively applied to each of the parts so partitioned, the display device can display characters or numerals. Furthermore, by dividing the anodic plate 11 into a number of dots or lines, and coating different phosphors on the different dots or lines, e.g. the gallate-based phosphor on some of the divided parts of the plate and a phosphor which emits light of a color different from that of the gallate-based phosphor on the other divided parts of the plate, a display device capable of providing a multicolor display can be obtained.

Figure 3:
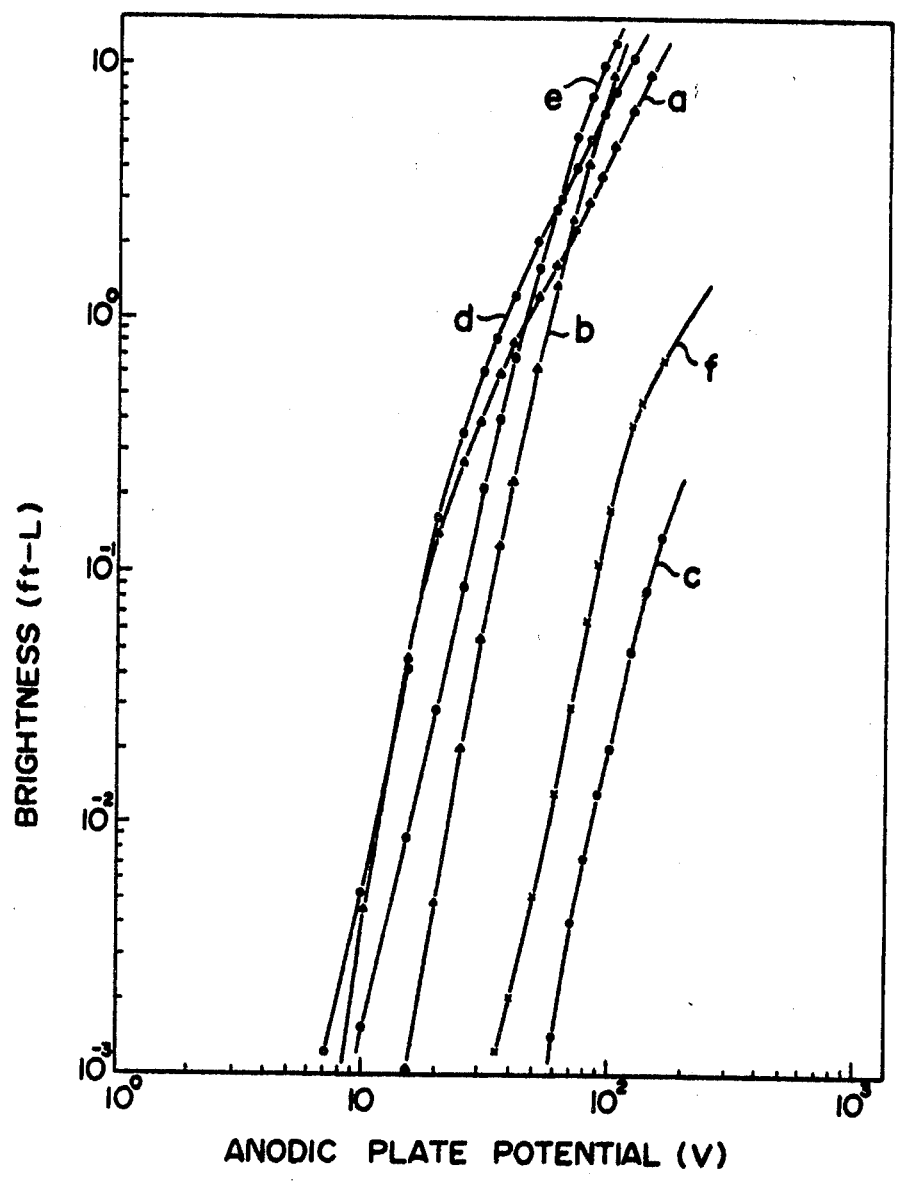
FIG. 3 is a graph showing the relation between the voltage applied to the anodic plate and the brightness of the fluorescent screen of the display device of this invention.

FIG. 3 is a graph showing the relation between the voltage applied to the anodic plate 11 and the brightness of the fluorescent screen 12 in the display device of this invention and curves (a), (b), (c), (d), (e) and (f) in the graph represent the relation between the brightness and the voltage when $ZnO \cdot Ga_2O_3$, $(Zn_{0.6}Mg_{0.4})O \cdot Ga_2O_3$, $MgO \cdot Ga_2O_3$, $0.95ZnO \cdot Ga_2O_3 : 0.01Mn$, $0.95(Zn_{0.8}Mg_{0.2})O \cdot Ga_2O_3 : 0.01Mn$, and $0.95MgO \cdot Ga_2O_3 : 0.01Mn$ are respectively used as the phosphors for the fluorescent screen.

As is clear from FIG. 3, the display device in accordance with this invention in which one of the gallate-based phosphors illustrated above is used emits light of high luminance when the fluorescent screen is excited by low-velocity electrons of a few tens to a few hundreds of volts.

In general, as the proportion of magnesium in the gallate-based phosphor becomes larger, that is, the value of $x$ in the composition formula showing the gallate-based phosphor increases, the anodic plate potential required for obtaining the same brightness becomes higher and thus the preferred value of $x$ in the composition formula is from 0 to 0.5 in view of the desirability of obtaining a high degree of luminance at the lowest anodic plate potential possible. Also, the brightness of the light emitted by the phosphor depends upon the mole ratio of $(Zn_{1-x}Mg_x)O$ to $Ga_2O_3$, that is, the value of A in the composition formula, because it has been found that when the value A of the gallate-based phosphor used in the display device is from 0.9 to 1.0, the fluorescent screen emits a light of particularly high luminance.

Next, the color of the light emitted by the display device of this invention will be explained in detail. The color of the emitted light depends upon the amount of manganese add as an activator, that is, the value of B in said formula. That is, when the activator is not used (i.e., B=0), the gallate-based phosphor emits blue light, which is emitted from the host material of the phosphor, but as the amount of the manganese increases, the blue emission of the host material decreases gradually and the green emission caused by the presence of the manganese used as the activator increases gradually. Consequently, the color of the emission shifts gradually from blue to green with the increase of the activator added. When the proportion of the activator becomes higher than $5 \times 10^{-4}$ gram atom per mole of the host material, the blue emission of the host material vanishes and only the green emission caused by the presence of the activator remains. In the above description, the term "1 mole of the host material" means 1 mole of $A(Zn_{1-x}Mg_x)O.Ga_2O_3$. Thus, in the display device of this invention using a gallate-based phosphor containing no manganese activator (i.e., B=0 in the aforesaid compositon formula), the fluorescent screen shows blue emission; when a gallate-based phosphor containing a manganese activator in an amount lower than $5 \times 10^{-4}$ gram atom per mole of the host material is used, the fluorescent screen shows green-blue to blue-green emission; and when a gallate-based phosphor containing manganese activator in an amount higher than $5 \times 10^{-4}$ gram atom per mole of the host material is used, the fluorescent screen shows green emission.

In addition, the color of the blue emission of the host material $AZnO,Ga_2O_3$ (i.e., $x=0$ and $B=0$ in the aforesaid composition formula) is different from that of the blue emission of the host material $A(Zn_{1-x}Mg_x)O.Ga_2O_3$ (i.e., $0 < x \leq 1$ and B=0 in the aforesaid composition formula), namely, the latter is of a longer wavelength than the former.

Figure 4:
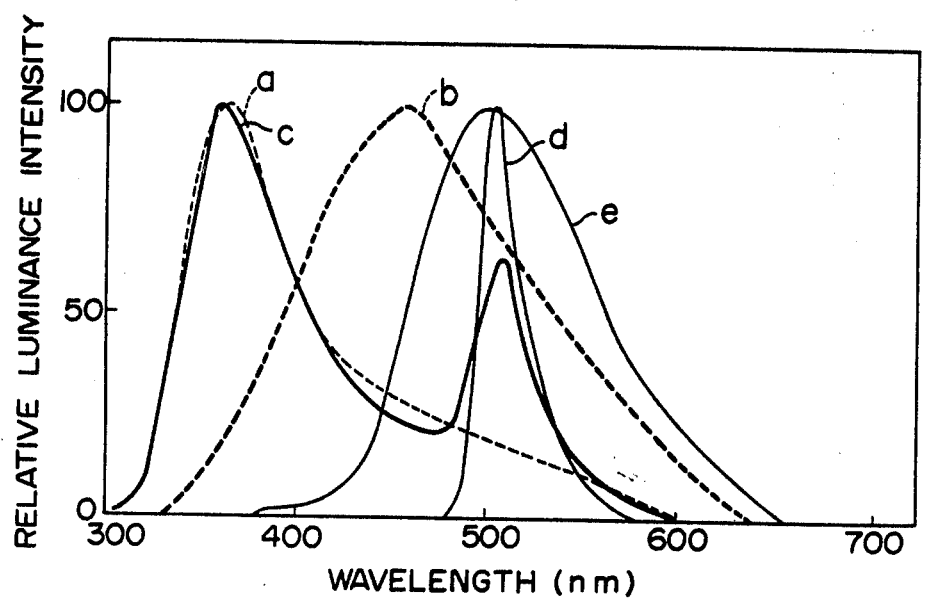
FIG. 4 is a graph showing the emission spectra of the display device of this invention in which the gallate-based phosphor is used as the fluorescent screen, and of a conventional display device employing ZnO:Zn.

FIG. 4 shows the emission spectra, curves (a), (b), (c) and (d), of the emitted light of the display devices of this invention in which a gallate-based phosphors are used as the fluorescent screens. For the sake of comparison, FIG. 4 also shows the emission spectrum, curve (e), of the emitted light in a conventional display device in which ZnO:Zn is used as the fluorescent screen. In FIG. 4, curves (a), (b), (c) and (d) represent the emission spectra of $ZnO.Ga_2O_3$, $(Zn_{0.6}Mg_{0.4})O.Ga_2O_3$, $0.95ZnO.Ga_2O_3$:0.0001Mn, and $0.95ZnO.Ga_2O_3$:0.01Mn, respectively. In particular, it will be noted that the green emitting type display device of this invention providing the emission spectra of curve (d) shows an extremely narrow or sharp half value width of emission spectra as compared with that of the conventional display device employing ZnO:Zn and, in other words, is quite excellent in color purity as compared with the latter.

Figure 5:
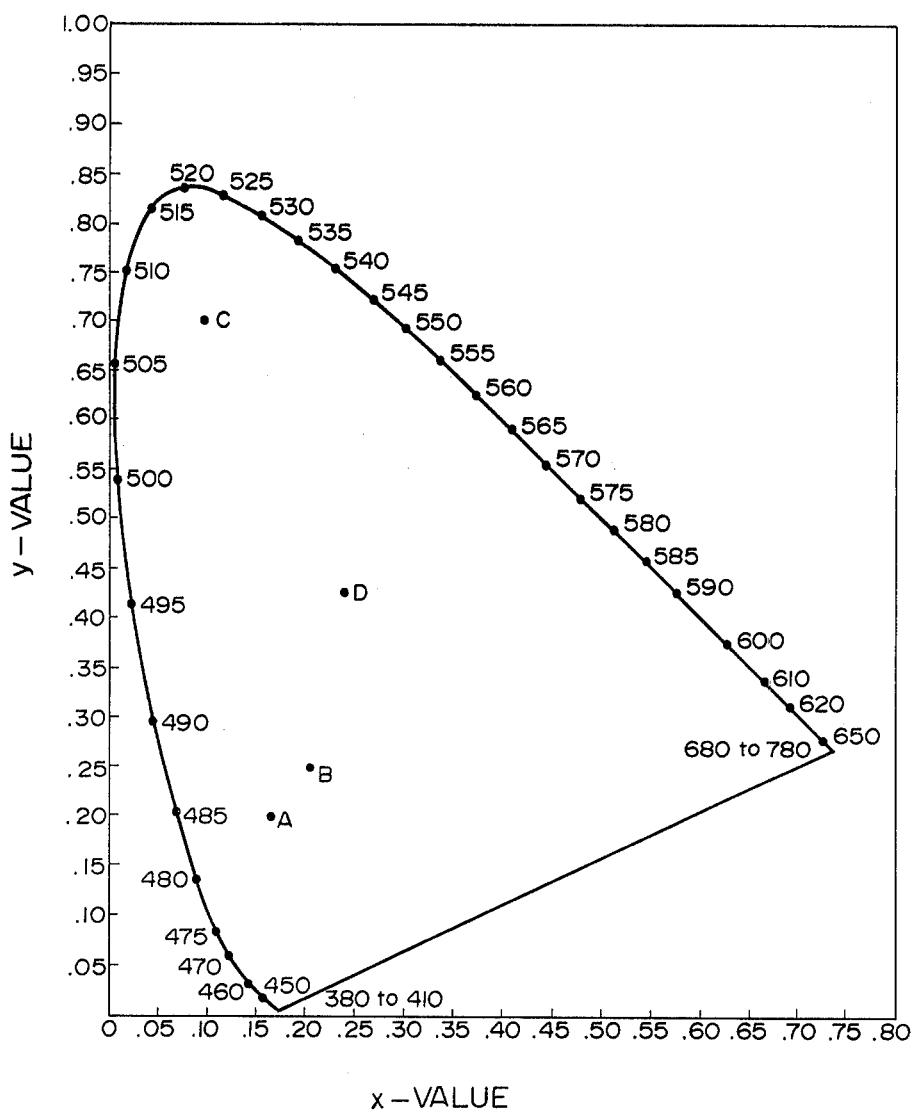
FIG. 5 is a CIE standard chromaticity diagram showing the color of the emitted light in the display device of this invention using the gallate-based phosphor and the color of the emitted light of a conventional display device employing ZnO:Zn.

In the CIE standard chromaticity diagram of FIG. 5, there are shown the emission chromaticity points (points A, B, and C) of the display device of this invention in which a gallate-based phosphor is used as the fluorescent screen and also shown, for the sake of comparison, the emission chromaticity point (point D) of the conventional display device employing ZnO:Zn. In the diagram, points A and B stand for the emission chromaticity points of the blue emitting type display devices in which the fluorescent screens are composed of $ZnO.Ga_2O_3$ and $(Zn_{0.8}Mg_{0.2})O$. $Ga_2O_3$ respectively, and point C stands for the emission chromaticity point of the green emitting type display device in which the fluorescent screens are composed of $0.95ZnO.Ga_2O_3$:0.01Mn and $0.95(Zn_{0.6}Mg_{0.4})O.Ga_2O_3$:0.01Mn respectively. As is clearly indicated in the CIE chromaticity diagram, the green emitting type display devices of this invention using gallate-based phosphors showing no green emission of the host material but showing only the green emission originating from the manganese used as the activator, that is, those devices whose gallate-based phosphors has been activated by manganese in the amounts of $5 \times 10^{-4}$ to $5 \times 10^{-2}$ gram atom per mole of the host material ($5 \times 10^{-4} \leq B \leq 5 \times 10^{-2}$), are far excellent in color purity. This is clear from the locus of the chromaticity point C as compared with the conventional display device employing ZnO.Zn which has the chromaticity point D. Moreover, the display device of this invention in which a gallate-based phosphor activated by manganese of an amount in the range of $1 \times 10^{-3}$ to $1 \times 10^{-2}$ per mole of the host material ($1 \times 10^{-3} \leq B \leq 1 \times 10^{-2}$) is used as the fluorescent screen gives green emission of particularly high luminance.

As stated above, the invention provides display devices emitting blue to green light of high luminance. In particular, the display device of this invention in which a gallate-based phosphor containing no manganese activator is used gives blue emission of excellent purity. Furthermore, the display device using a gallate-based phosphor activated by manganese in an amount of $5 \times 10^{-4}$ to $5 \times 10^{-2}$ gram atom per mole of the host material ($5 \times 10^{-4} \leq B \leq 5 \times 10^{-2}$) gives green emission of superior purity.

Now, the invention will be further explained more concretely by the following examples.

EXAMPLE 1

An aluminum anodic plate of 2cm × 1cm area supported on a ceramic base plate was placed in an aqueous suspension of 200mg of a powder of $ZnO.Ga_2O_3$ in 100ml of distilled water containing 0.01% water glass ($K_2O.SiO_2$ 20% solution) to coat the surface of the aluminum plate with $ZnO.Ga_2O_3$ at a coverage of 10mg/cm$^2$, whereby a fluorescent layer or screen was formed. The anodic plate having the fluorescent screen and a cathode composed of a tungsten wire heater coated with an oxide were disposed at an interval of 5mm with said plate facing the fluorescent screen. The pair of the electrodes were fixed in a hard glass container, which was then evacuated. When the inside pressure of the container reached about $10^{-5}$ Torr, the evacuation was stopped, the container was sealed, and then getters were evaporated therein to decrease the inside pressure of the container. Thus, the display device having the structure as illustrated in FIG. 1 was obtained. When electric potentials of 80 and 0.6 volts were applied to the anodic plate and the cathode respectively, the display device emitted blue light of 4ft-L with a cathode current of 40 milliamperes.

EXAMPLE 2

A display device having the same structure as in Example 1 was prepared by the same procedure as in Example 1 except that $(Zn_{0.8},Mg_{0.2})O\cdot Ga_2O_3$ was used as the phosphor for the fluorescent screen. When electric potentials of 80 and 0.6 volts were applied to the anodic plate and the cathode respectively, the display device emitted blue light of 8ft-L with a cathode current of 40 milliamperes.

EXAMPLE 3

A display device having the same structure as in Example 1 was prepared by the same procedure as in Example 1 except that $0.98ZnO\cdot Ga_2O_3:0.005Mn$ was used as the phosphor for the fluorescent screen. When electric potentials of 80 and 0.6 volts were applied to the anodic plate and the cathode respectively, the display device emitted green light of high purity of 6ft-L with a cathode current of 40 milliamperes.

EXAMPLE 4

A display device having the same structure as in Example 1 was prepared by the same procedure as in Example 1 except that $0.98(Zn_{0.8},Mg_{0.2})O\cdot Ga_2O_3:0.01Mn$ was used as the phosphor for the fluorescent screen. When electric potentials of 80 and 0.6 volts were applied to the anodic plate and the cathode respectively, the display device emitted green light of high purity of 7ft-L with a cathode current of 40 milliamperes.

EXAMPLE 5

A display device having the same structure as in Example 1 was prepared by the same procedure as in Example 1 except that $0.95\ (Zn_{0.9},Mg_{0.1})O\cdot Ga_2O_3:0.005Mn$ was used as the phosphor for the fluorescent screen. When electric potentials of 80 and 0.6 volts were applied to the anodic plate and the cathode respectively, the display device emitted green light of high purity of 6ft-L with a cathode current of 40 milliamperes.

EXAMPLE 6

A display device having the same structure as in Example 1 was prepared by the same procedure as in Example 1 except that $0.9\ (Zn_{0.5},Mg_{0.5})O\cdot Ga_2O_3:0.01Mn$ was used as the phosphor for the fluorescent screen. When electric potentials of 50 and 0.6 volts were applied to the anodic plate and the cathode respectively, the display device emitted green light of high purity of 1ft-L with a cathode current of 40 milliamperes.

We claim:

1. A low-velocity electron excited fluorescent display device composed of a vacuum container or tube containing disposed therein at least an anodic plate having formed on one surface thereof a fluorescent screen and a cathode in line-form paralleling said fluorescent screen, said fluorescent screen comprising a gallate-based phosphor represented by the formula $$A(Zn_{1-x}Mg_x)O\cdot Ga_2O_3:BMn$$

wherein $0.6 \leq A \leq 1.2$, $0 \leq B \leq 5 \times 10^{-2}$, and $0 \leq x \leq 0.5$.

2. A fluorescent display device as claimed in claim 1 wherein said gallate-based phosphor is represented by the formula $$A(Zn_{1-x}Mg_x)O\cdot Ga_2O_3:BMn$$

wherein $0.9 \leq A \leq 1.0$, and $5 \times 10^{-4} \leq B \leq 5 \times 10^{-2}$.

3. A fluorescent display device as claimed in claim 1 wherein said gallate-based phosphor is represented by the formula $$A(Zn_{1-x}Mg_x)O\cdot Ga_2O_3$$

wherein $0.9 \leq A \leq 1.0$.

4. A fluorescent display device as claimed in claim 1 wherein a control grid is disposed between said anodic plate and said cathode.

* * * * *